Figure 1:
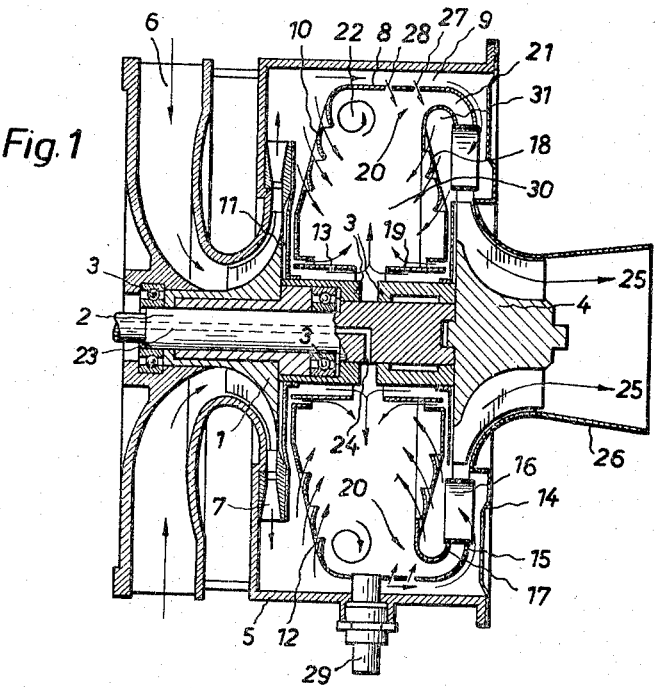

May 30, 1967

U. OPRECHT 3,321,912

GAS TURBINE PLANT

Filed Nov. 14, 1963

INVENTOR
ULRICH OPRECHT by

Atty

United States Patent Office 3,321,912
Patented May 30, 1967

3,321,912
GAS TURBINE PLANT
Ulrich Oprecht, Wittenbach, Saint Gall, Switzerland, assignor to Adolph Saurer Ltd., Arbon, Switzerland
Filed Nov. 14, 1963, Ser. No. 323,671
Claims priority, application Switzerland, Nov. 14, 1962, 13,293/62
2 Claims. (Cl. 60—39.36)

This invention relates to gas turbine plants, and more particularly to gas turbine plants of the kind involving a coaxial arrangement of compressor blading, annular combustion chamber and turbine blading, and admission of air conveyed by the compressor blading to the housing surrounding the annular combustion chamber, in a manner such that it includes a circumferentially directed velocity component, air flowing from the housing into the annular combustion chamber being divided as usual into a combustion sustaining current of combustion air, and a blending air current designed to cool the hot combustion gases to the temperature suitable for the turbine blading.

It is known to convey from the compressor, air having a circumferentially directed velocity component into the housing surrounding the annular combustion chamber. Compared with the conventional purely axial feed, this arrangement is advantageous in that it involves a reduction of the usual flow losses. With a radial compressor, for example, the air, dependent on the design of the guide wheel, enters the housing surrounding the combustion chamber with a larger or smaller angle of momentum and on deflection in axial direction, would suffer material flow losses. With an axial compressor, the guide wheel following the last runner may be dispensed with. Moreover, this deflection in axial direction results in a danger of uneven flow from the deflecting grid, which has a disadvantageous effect on the temperature distribution along the circumference of the combustion chamber exit. If, however, the rotary motion in circumferential direction is maintained, uniformity of admission of fresh air over the entire circumference is insured.

Since with this arrangement, combustion air and blending air currents enter the combustion chamber proper with approximately equal circumferentially directed velocity components, stabilization of combustion is possible only if special devices such as flame guides are employed, or the circumferentially directed velocity components are materially greater than the axial ones. Moreover, ready intermixture of the hot combustion gases with the cooling blending air current is impeded as the two currents circulate in the same direction.

It is a primary object of this invention to eliminate these drawbacks.

Other objects and the manner in which the same are attained, will become apparent as this specification proceeds.

The invention contemplates providing a gas turbine plant wherein the wall of the combustion chamber has openings through which the combustion air current passes, these openings having a guide effect such that on entry into the combustion chamber, the combustion air current lacks substantially any velocity component in circumferential direction, and wherein bores having no guiding effect are provided in the wall of the combustion chamber, for passage of the blending air current.

Stabilization of the combustion is advantageously effected by providing the openings having a guide effect in at least one front wall of the combustion chamber which is disposed at least approximately at right angles to the gas turbine axis, the openings being arranged so that the combustion air current is guided from an outward perimeter largely inwardly and radially toward the inner wall of the combustion chamber which is coaxially disposed relative to the gas turbine shaft, the bores having no guiding effect and serving as pasages admitting the blending air current into the combustion chamber, being disposed mostly along the outer circumference of the combustion chamber. In order to achieve symmetry in the combustion zone, the first vane ring may be provided hollow in a manner known per se, to permit passage of combustion air; the combustion air current passes through this vane ring and subsequently through the rear wall, disposed downstream, of the combustion chamber through openings having a guide effect in this wall, toward the inner wall of the combustion chamber disposed coaxially relative to the gas turbine axis, to be deflected thereon in axial upstream direction.

An intimate mixture of the hot combustion gases and the cool blending air current is much more readily obtained by the provision on the outer downstream circumference of the combustion chamber, of an annular channel coaxially disposed relative to the axis of the combustion chamber, through which the hot combustion gases, once they are cooled by the blending air current to a temperature suitable for the turbine blading, pass into the vane ring of the turbine blading.

The invention achieves uniformity of temperature over the entire circumference of the combustion chamber exit, and simplicity of construction due to the avoidance of several fuel inlets on the circumference of the combustion chamber, by providing in the turbine shaft, injection orifices for rotary spray of fuel in the combustion chamber, the spraying plane being disposed at least approximately midway between the two combustion air currents which flow in opposite directions along the inner walls of the combustion chamber.

Experience has demonstrated that the ignition of the fuel air mixture is effected most safely and prompt if the igniter for initiating combustion is arranged on the outer periphery of the combustion chamber, at least approximately in the spraying plane of the fuel.

In the drawing accompanying this specification and forming part thereof, one embodiment of the invention is illustrated by way of example and with no limitative intent. This embodiment includes a radial compressor, a so-called radial turbine, and an annular combustion chamber provided between said compressor and said turbine. Compressors and turbines provided with axial bladings or mixed type combinations, however, are equally suitable.

Figure 2:
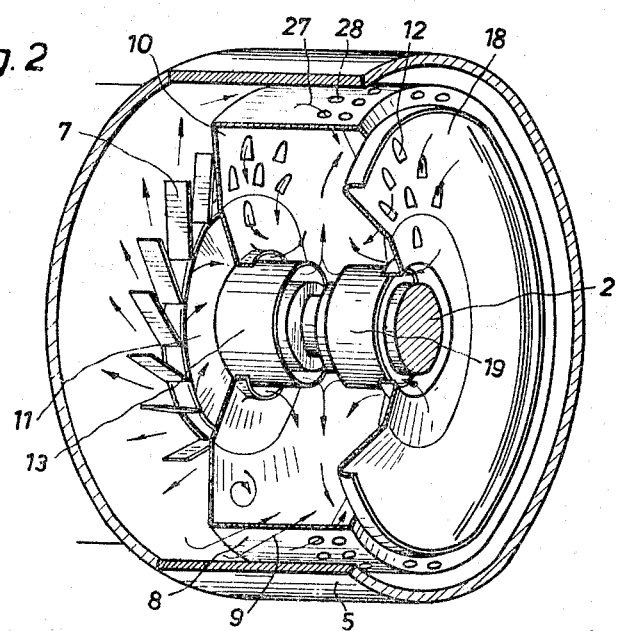

In the drawing, FIG. 1 shows a longitudinal section through the entire aggregate, while FIG. 2 illustrates, in perspective, the current flow in the annular combustion chamber shown, on a somewhat smaller scale, as part of the aggregate in FIG. 1.

Referring to the drawing, wherein identical parts are denoted by like reference numerals, the gas turbine includes compressor impeller 1 mounted on shaft 2, bearing and packing 3, turbine 4 and housing 5. The impeller 1 draws in air from the outside through intake ducts 6 and conveys it through the stationary diffuser vanes 7, into the space between housing 5 and outer wall 8 of the combustion chamber. The diffuser vanes 7 provide the inlet air which comes into the combustion chamber and are arranged inclined relative to the circumferential direction of the fresh air current which flows in the space 9 between the outer wall 8 of the combustion chamber and the housing 5 to create a helically directed flow therethrough. In the embodiment illustrated in the drawing, the circumferential velocity component is about 60 percent of the axial velocity component.

A part of the fresh air current, intended to form part of the combustion air, flows helically inward between the front wall 10 on the compressor side of the combustion chamber 30, and a compressor shield 11, and loses in the course of its passage through the front wall 10, its circumferential component, due to the radially and inwardly directed guide slots 12. In the interior of the annular combustion chamber 30 which is delimited by the walls 10, 8, 18, 13, and 19, this combustion air current is deflected on the inner wall 13 which is coaxially disposed relative to the gas turbine axis, in axial direction downstream.

Another portion of the fresh air current at the rear wall 15 intended to form another combustion air current, flows helically inwardly from space 9 between the housing cover 14 and the rear 15 of the annular channel 21 which extends beyond the rear wall of the combustion chamber through openings in the vane ring 16 into the space 31 between the front wall 17 of the annular channel 21 and the rear wall 18 on the turbine side of the combustion chamber 30, and on passing through the rear wall 18, loses any circumferential flow component, due to the radially and inwardly directed guide slots 12 through which it has passed. In the interior of the combustion chamber 30, this part of the combustion air current is deflected on the inner wall 19 of the combustion chamber, in axial direction upstream. It encounters the first combustion air current and therewith combines into the combustion air 20 which for reasons of continuity, flows about in the center of the combustion chamber 30 radially outward and through the annular channel 21 which is disposed coaxially relative to the axis of the combustion chamber into the vane ring 16.

This flow of the combustion air current which is first directed radially inward, and then directed radially outward, generates—particularly in the corner between the outer wall 8 of the combustion chamber and the front wall 10 on the compressor side of the combustion chamber—a back flow zone 22 in the form of an annular whirl or eddy disposed coaxially relative to the axis of the combustion chamber, which is the prerequisite for stabilizing combustion even in the face of great variations of the operating conditions. Since, furthermore the fuel which in a manner not shown in detail, is supplied through the end of the shaft on the compressor side, is centrifuged by means of the longitudinal bore 23 and the radial injection apertures 24, in a plane centrally disposed relative to the radially outwardly directed combustion air current, into the combustion chamber 30, it is possible, in conjunction with the above-mentioned back flow zone 22, to achieve the desired intense reaction of combustion air and fuel. The spark plug 29 for initiating combustion, is located on the outer circumference of the combustion chamber, approximately in the spraying plane of the fuel. The hot combustion gases 25 flow for reasons of continuity, along the outer wall 8 of the combustion chamber, into the annular channel 21, and from here through the vane ring 16 and while performing work, through the turbine 4 into the exhaust pipe 26. In order to maintain a temperature of the combustion gases which is suitable for the turbine blading, the blending air current 27 is branched off from the fresh air and enters, while still having a circumferentially directed velocity component, through simple bores 28 which have no guiding effect, through its outer wall 8 into the combustion chamber 30 to cool the combustion gases to the extent necessary. The temperature suitable for the turbine blading is such that the blending air current is likely to exceed the combustion air current; its dragging effect, therefore, imparts a mild circumferential motion to the combustion gases. This may be taken into account, of course, in designing the vane ring, and in addition to the circumferential temperature equalization which must not be underestimated, has the advantage of shock-like transfer of the ignition to the entire content of the combustion chamber, following initiation of the ignition by the spark plug 29 on the outer wall of the combustion chamber in the spraying plane of the fuel.

I wish it to be understood that I do not desire to be limited to the exact details of construction, design and operation shown and described, as modifications within the scope of the appended claims and involving no departure from the spirit of the invention nor any sacrifice of the advantages thereof, may occur to persons skilled in the art.

I claim:

1. In a gas turbine plant having a compressor, coaxially arranged compressor blades, an annular combustion chamber, a casing surrounding the annular combustion chamber, a turbine and ring of turbine blades arranged coaxially with said compressor, first means for conveying air having a circumferential velocity component from the compressor blades into said casing, second means for dividing the air passing from said casing into said annular combustion chamber into a primary air current for combustion and into a secondary air current for cooling, said combustion chamber including substantially radial front and rear walls and outer and inner circumferential walls, the improvement comprising openings in the front wall of the combustion chamber which have a directional effect, said front wall extending at substantially right angles to the axis of the gas turbine, said openings being disposed to direct the primary air current passing through these front wall openings from the outer circumference radially inwardly towards the inner wall of the combustion chamber which is disposed coaxially with the axis of the gas turbine, further openings on the outer circumferential wall of the combustion chamber which have no directional effect and serve to admit secondary air current into the combustion chamber, said combustion chamber having an annular exhaust passage including a ring of turbine stator vanes which are hollow to permit passage of primary air therethrough, said combustion chamber having its rear wall located upstream of the ring of turbine stator vanes so that the primary air is conveyed through said stator vane ring and through openings in said rear wall with directional effect to be deflected from the outer circumference radially inwardly towards the inner wall and axially thereon in upstream direction, and an annular channel disposed between the casing and the outer wall of the combustion chamber coaxial with the axis of the chamber, the combustion gases being cooled by the secondary air before the air reaches the turbine blades.

2. A gas turbine plant according to claim 1, comprising a turbine shaft on said turbine having spraying apertures therein, said apertures being adapted for atomization of fluid fuel into the combustion chamber, the spraying plane being disposed at least substantially mid-way between the two combustion air currents flowing in opposite directions along the inner walls of the combustion chamber and ignition means disposed on the outer circumferential wall of the combustion chamber.

References Cited

UNITED STATES PATENTS

| 2,924,937 | 2/1960 | Leibach | 60—39.36 |
| 2,974,485 | 3/1961 | Schiefer | 60—39.65 |
| 3,018,625 | 1/1962 | Bachle | 60—39.74 |
| 3,088,279 | 5/1963 | Diedrich | 60—39.36 |
| 3,126,703 | 3/1964 | Oprecht | 60—39.36 |

FOREIGN PATENTS

| 1,014,791 | 8/1957 | Germany. |

JULIUS E. WEST, *Primary Examiner.*

RALPH D. BLAKESLEE, *Examiner.*